(12) United States Patent
Nakamura et al.

(10) Patent No.: US 12,431,617 B2
(45) Date of Patent: Sep. 30, 2025

(54) COMMUNICATION APPARATUS AND METHOD

(71) Applicant: TOSHIBA TEC KABUSHIKI KAISHA, Tokyo (JP)

(72) Inventors: Koki Nakamura, Sunto Shizuoka (JP); Takashi Tomiyama, Sunto Shizuoka (JP); Hiroyuki Ishikawa, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 489 days.

(21) Appl. No.: 18/075,769

(22) Filed: Dec. 6, 2022

(65) Prior Publication Data
US 2023/0307827 A1 Sep. 28, 2023

(30) Foreign Application Priority Data
Mar. 23, 2022 (JP) .................. 2022-046612

(51) Int. Cl.
*G08B 5/22* (2006.01)
*G06K 7/10* (2006.01)
*G08B 25/00* (2006.01)
*H01Q 1/22* (2006.01)
*H01Q 3/02* (2006.01)

(52) U.S. Cl.
CPC .......... *H01Q 3/02* (2013.01); *G06K 7/10366* (2013.01); *H01Q 1/2216* (2013.01)

(58) Field of Classification Search
CPC ..... H01Q 3/02; H01Q 1/2216; G06K 7/10366
See application file for complete search history.

(56) References Cited

U.S. PATENT DOCUMENTS

| | | | | |
|---|---|---|---|---|
| 4,881,163 | A * | 11/1989 | Thomas | G06F 5/06 711/E12.04 |
| 7,575,176 | B2 * | 8/2009 | Sugano | G06K 7/0008 235/492 |
| 9,235,740 | B1 * | 1/2016 | Graybill | G06Q 10/087 |
| 10,095,894 | B1 * | 10/2018 | Bellows | G06Q 10/087 |
| 10,373,399 | B2 * | 8/2019 | Yang | H04N 7/188 |

(Continued)

FOREIGN PATENT DOCUMENTS

JP 2021-110982 A 8/2021

*Primary Examiner* — Quang Pham
(74) *Attorney, Agent, or Firm* — FOLEY & LARDNER LLP

(57) ABSTRACT

A communication apparatus includes an antenna, a driving unit, a reading control unit, an acquisition unit, and a setting unit. The driving unit is configured to move a relative position of the antenna relative to one or more wireless tags. The measurement control unit is configured to control measurement of tag data of the one or more wireless tags based on reception of radio waves from the one or more wireless tags by the antenna. The acquisition unit is configured to acquire the number of the one or more wireless tags based on the measurement of the tag data of the one or more wireless tags that is accompanied by the movement of the relative position at a first moving speed. The setting unit is configured to set a second moving speed of the relative position based on the acquired number of the one or more wireless tags. The measurement control unit controls measurement of the tag data of the one or more wireless tags that is accompanied by movement of the relative position at the set second moving speed.

14 Claims, 10 Drawing Sheets

| NUMBER OF TAGS N | SPEED [mm/s] |
|---|---|
| N<20 | 30 |
| 20≦N<30 | 15 |
| 30≦N | 5 |

(56) References Cited

U.S. PATENT DOCUMENTS

| | | | |
|---|---|---|---|
| 11,361,171 B2* | 6/2022 | Murofushi | G06K 7/10158 |
| 2004/0036575 A1* | 2/2004 | Patterson | G06K 7/0008 |
| | | | 340/10.2 |
| 2006/0092014 A1* | 5/2006 | Onderko | G06K 7/10336 |
| | | | 340/539.13 |
| 2006/0197653 A1* | 9/2006 | Kung | G06K 19/0723 |
| | | | 340/10.34 |
| 2007/0001808 A1* | 1/2007 | Kastelic | G06K 7/10079 |
| | | | 340/572.1 |
| 2007/0023520 A1* | 2/2007 | Miyashita | G01S 13/825 |
| | | | 235/451 |
| 2008/0198487 A1* | 8/2008 | Lala Balaji | G11B 5/633 |
| | | | 340/572.1 |
| 2008/0266095 A1* | 10/2008 | Hanebeck | G08B 13/2402 |
| | | | 340/572.1 |
| 2008/0266096 A1* | 10/2008 | Hanebeck | G06Q 10/08 |
| | | | 340/572.1 |
| 2008/0266106 A1* | 10/2008 | Lim | G01S 13/82 |
| | | | 340/572.7 |
| 2010/0090807 A1* | 4/2010 | Tsujimoto | G06K 7/0008 |
| | | | 340/10.4 |
| 2010/0295681 A1* | 11/2010 | Burns | G01S 5/14 |
| | | | 340/572.1 |
| 2010/0328039 A1* | 12/2010 | Noda | G01S 13/876 |
| | | | 174/110 R |
| 2011/0316675 A1* | 12/2011 | Tsujimoto | G06K 7/10217 |
| | | | 340/10.4 |
| 2014/0167920 A1* | 6/2014 | Kamiya | G01S 13/58 |
| | | | 340/10.1 |
| 2016/0158625 A1* | 6/2016 | DeAngelis | H04W 4/08 |
| | | | 340/539.13 |
| 2017/0092090 A1* | 3/2017 | Lerner | G08B 13/2462 |
| 2017/0372106 A1* | 12/2017 | Wilkinson | G05B 19/12 |
| 2018/0053171 A1* | 2/2018 | Suzuki | G06Q 20/208 |
| 2018/0074159 A1* | 3/2018 | Mullessary | G01S 13/84 |
| 2019/0087615 A1* | 3/2019 | Tomiyama | G06K 7/10356 |
| 2019/0122016 A1* | 4/2019 | Forster | G07F 7/0873 |
| 2019/0144206 A1* | 5/2019 | Yaginuma | G06K 7/10475 |
| | | | 340/572.1 |
| 2019/0251825 A1* | 8/2019 | Sahud | G06M 1/27 |
| 2019/0303631 A1* | 10/2019 | Ogawa | G06K 7/10108 |
| 2019/0311162 A1* | 10/2019 | Khojastepour | G01S 13/751 |
| 2019/0392183 A1* | 12/2019 | Oishi | G06K 7/10376 |
| 2020/0042754 A1* | 2/2020 | Trivelpiece | G06K 7/10366 |
| 2020/0050810 A1* | 2/2020 | Watanabe | G06K 7/10425 |
| 2020/0104906 A1* | 4/2020 | Uchimura | G06Q 30/0639 |
| 2023/0062536 A1* | 3/2023 | Ishikawa | G06K 7/10128 |
| 2023/0174303 A1* | 6/2023 | Ikawa | G06K 7/10356 |
| | | | 700/215 |
| 2023/0176172 A1* | 6/2023 | Ishikawa | G01S 5/0249 |
| | | | 342/450 |
| 2023/0177289 A1* | 6/2023 | Ishikawa | G06K 7/10 |
| 2023/0177290 A1* | 6/2023 | Ishikawa | G06K 7/10366 |
| | | | 235/451 |
| 2024/0086657 A1* | 3/2024 | Uehara | G11B 27/102 |
| 2024/0094369 A1* | 3/2024 | Sakurai | G01S 5/02 |
| 2024/0104318 A1* | 3/2024 | Minogue | G06K 7/10475 |
| 2024/0159856 A1* | 5/2024 | Walk | G01S 5/0252 |
| 2024/0249090 A1* | 7/2024 | Ishiyama | H01Q 1/2216 |
| 2024/0330621 A1* | 10/2024 | Ishikawa | G06K 7/10366 |
| 2024/0357539 A1* | 10/2024 | Ishikawa | H04B 17/3912 |

* cited by examiner

FIG. 4

| NUMBER OF TAGS N | SPEED [mm/s] |
|---|---|
| N<20 | 30 |
| 20≦N<30 | 15 |
| 30≦N | 5 |

COMMUNICATION APPARATUS AND METHOD

CROSS-REFERENCE TO RELATED APPLICATION

This application is based upon and claims the benefit of priority from Japanese Patent Application No. 2022-046612 filed on Mar. 23, 2022, the entire contents of which are incorporated herein by reference.

FIELD

Embodiments described herein relate generally to a communication apparatus and a method.

BACKGROUND

Wireless tags are increasingly attached to an article instead of attaching a barcode to an article. In this case, a wireless reader/writer reads information stored in a wireless tag through wireless communication with the wireless tag.

In addition, the wireless reader/writer measures tag data such as a phase at a plurality of relative positions of an antenna relative to wireless tags based on reception of radio waves from the wireless tags. The tag data is used for determining whether a wireless tag is present inside or outside a predetermined region.

However, the number of pieces of data that can be measured per unit time by the wireless reader/writer has an upper limit. In the wireless reader/writer, if the scanning speed is excessively high, there may be a case where tag data cannot be measured at some of the plurality of relative positions depending on the number of wireless tags.

DESCRIPTION OF THE DRAWINGS

FIG. 4 is a diagram illustrating an example of a data structure configuring speed data;

DETAILED DESCRIPTION

A technique of setting a scanning speed suitable for measurement of tag data of a wireless tag is provided.

In general, according to one embodiment, a communication apparatus includes an antenna, a driving unit (driver), a reading control unit, an acquisition unit (of a processor), and a setting unit (of a processor). The driving unit is configured to move a relative position of the antenna relative to one or more wireless tags. The measurement control unit (of a processor) is configured to control measurement of tag data of the one or more wireless tags based on reception of radio waves from the one or more wireless tags by the antenna. The acquisition unit is configured to acquire the number of the one or more wireless tags based on the measurement of the tag data of the one or more wireless tags that is accompanied by the movement of the relative position at a first moving speed controlled by the measurement control unit. The setting unit is configured to set a second moving speed of the relative position based on the number of the one or more wireless tags acquired by the acquisition unit. The measurement control unit controls measurement of the tag data of the one or more wireless tags that is accompanied by movement of the relative position at the second moving speed set by the setting unit.

Configuration Example

Hereinafter, a communication system according to an embodiment will be described using the drawings. In addition, in each of the drawings used for the description of the embodiment, the scale of each of components may be appropriately changed. In addition, each of the drawings in the following embodiment may not illustrate a configuration for description.

Figure 1:
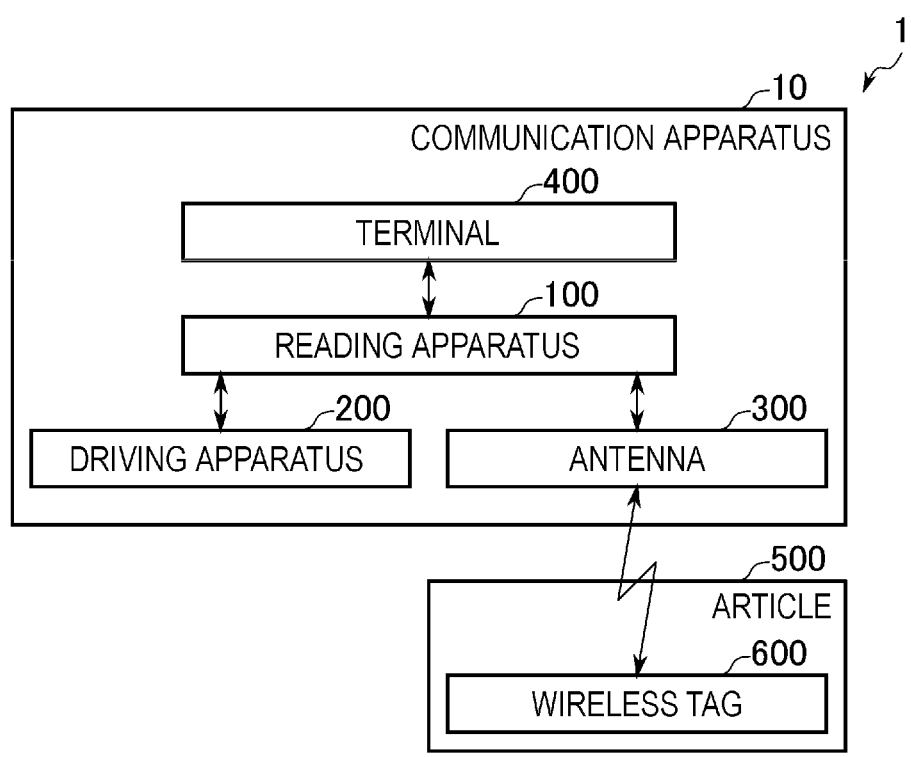
FIG. 1 is a block diagram illustrating an example of a configuration of a communication system according to at least one embodiment.

FIG. 1 is a block diagram illustrating an example of a configuration of a communication system 1 according to at least one embodiment.

The communication system 1 includes a communication apparatus 10 and one or more wireless tags 600 attached to one or more articles 500. FIG. 1 illustrates one wireless tag 600 attached to one article 500. The communication system 1 includes one or more wireless tags 600 attached to one or more articles 500.

The communication apparatus 10 wirelessly communicates with the wireless tag 600. The communication apparatus 10 can be used for, for example, inspection in a warehouse. However, an application example of the communication apparatus 10 is not limited to this example. The communication apparatus 10 includes a reading apparatus 100, a driving apparatus 200, an antenna 300, and a terminal 400.

The reading apparatus 100 controls the driving apparatus 200 and the antenna 300 to read information from the wireless tag 600. The reading apparatus 100 controls the driving apparatus 200 and the antenna 300 to measure tag data of the wireless tag 600. The meaning of measurement includes detection. The tag data includes at least one of a phase or a received signal strength indicator (RSSI). A configuration example of the reading apparatus 100 will be described below.

The driving apparatus 200 moves the antenna 300. The movement of the antenna 300 includes movement of a position of the antenna 300. The driving apparatus 200 reciprocates the antenna 300 in one direction from a position 0 corresponding to a home position to a position L. The position L can be appropriately set. A moving range of the antenna 300 is a range where a relative position of the antenna 300 relative to one or more target wireless tags moves. The moving range of the antenna 300 is a range in one direction from the position 0 corresponding to the home position to the position L. Hereinafter, all of the wireless tags 600 in a radiation range in the moving range of the antenna 300 will also be referred to as the one or more target wireless tags. The one or more target wireless tags will also be referred to as all of the target wireless tags. The radiation range in the moving range of the antenna 300 is a radiation range of radio waves from the antenna 300 in the moving range of the antenna 300. The radiation range in the moving range of the antenna 300 is a range where radiation ranges of radio waves continuously transmitted from the antenna 300 in the moving range of the antenna 300 are combined. For example, the radiation range in the moving range of the antenna 300 is a range where radiation ranges of radio waves continuously transmitted from the antenna 300 while the antenna 300 is moving from the position 0 to the position L are combined.

The target wireless tag is a wireless tag that is a target for which a range where the target wireless tag is present is determined. The determination of the range where the target wireless tag is present includes determination whether a position of the target wireless tag is included in a first range or a second range. The first range and the second range are different ranges that do not overlap each other. For example, the first range and the second range are three-dimensional areas. Examples of the first range and the second range will be described below.

Here, it is assumed that the antenna 300 moves but the positions of the one or more target wireless tags do not move. The movement of the antenna 300 is an example of moving the relative position of the antenna 300 relative to the one or more target wireless tags moves. The position of the antenna 300 is an example of the relative position of the antenna 300 relative to the one or more target wireless tags.

The antenna 300 communicates with the wireless tag 600. For example, the antenna 300 communicates with the one or more target wireless tags. The communication with the one or more target wireless tags includes all or a part of the one or more target wireless tags. The antenna 300 transmits a radio wave. The antenna 300 receives a radio wave from the wireless tag 600. The radio wave from the wireless tag 600 is a radio wave transmitted from the wireless tag 600. The radio wave from the wireless tag 600 is an example of a response wave from the wireless tag 600 in response to the radio wave transmitted from the antenna 300. The response wave will also be referred to as a response. The antenna 300 converts the radio wave received from the wireless tag 600 into a high-frequency signal and outputs the high-frequency signal to the reading apparatus 100.

The terminal 400 is an apparatus that processes information read from the wireless tag 600 by the reading apparatus 100. The terminal 400 is, for example, a personal computer (PC) but is not limited thereto as long as it is an apparatus that processes data.

The article 500 is, for example, a commodity.

The wireless tag 600 is an IC tag including an IC chip and an antenna. The wireless tag 600 is typically a radio frequency identification (RFID) tag. The wireless tag 600 may also be another IC tag. The wireless tag 600 is a passive wireless tag that operates using a radio wave transmitted from the antenna 300 as an energy source. The wireless tag 600 performs backscatter modulation on an unmodulated signal to transmit a signal including information stored in the IC chip of the wireless tag 600 through the antenna. The information stored in the wireless tag 600 may include information that is uniquely identifiable. The information stored in the wireless tag 600 may include information regarding the article 500 to which the wireless tag 600 is attached.

The reading apparatus 100 will be described using FIG. 2.

Figure 2:
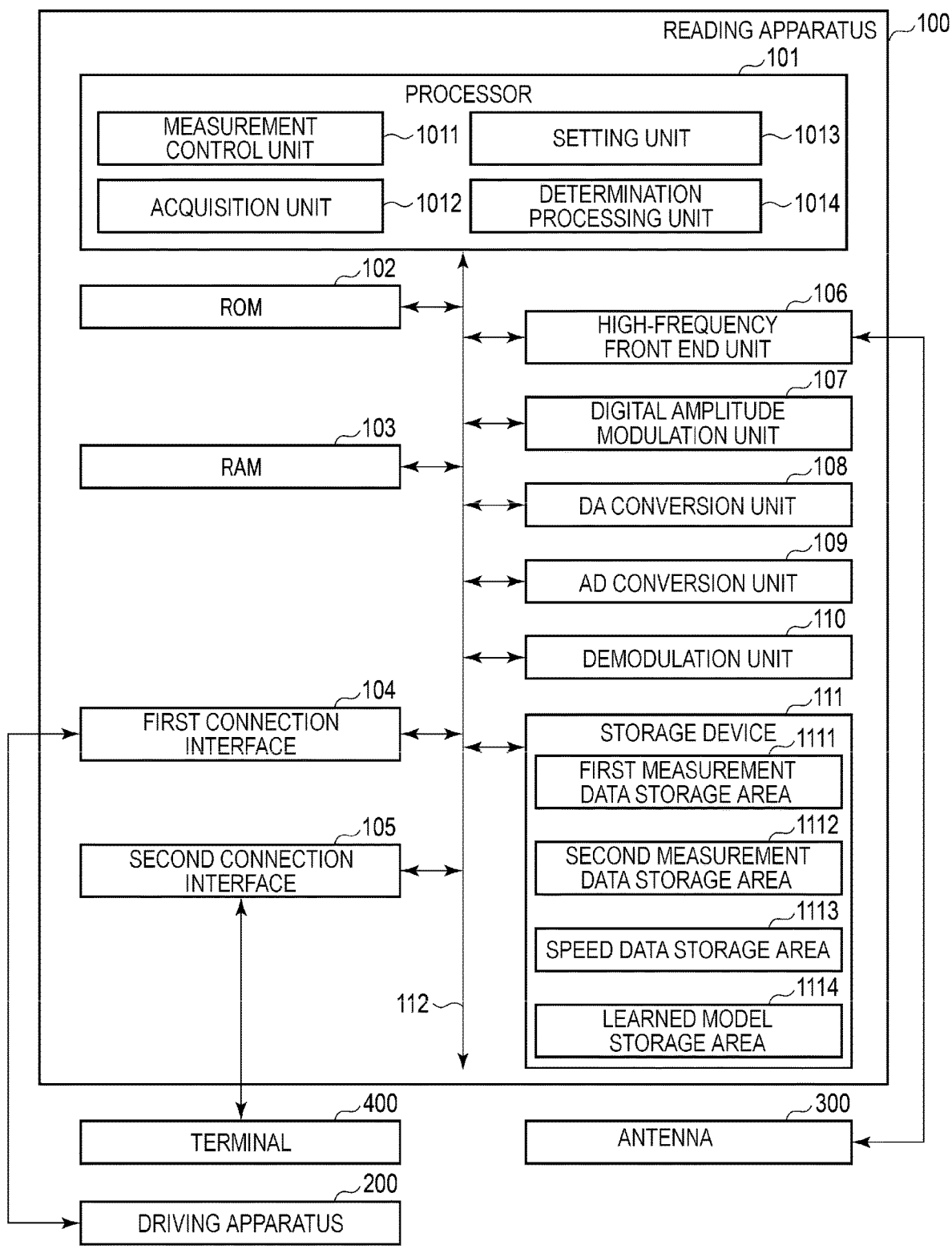
FIG. 2 is a block diagram illustrating an example of a configuration of a reading apparatus.

FIG. 2 is a block diagram illustrating an example of the configuration of the reading apparatus 100.

The reading apparatus 100 includes a processor 101, a read-only memory (ROM) 102, a random-access memory (RAM) 103, a first connection interface 104, a second connection interface 105, a high-frequency front end unit 106, a digital amplitude modulation unit 107, a digital to analog (DA) conversion unit 108, an analog to digital (AD) conversion unit 109, a demodulation unit 110, and a storage device 111. The units in the reading apparatus 100 are connected to each other through a bus 112 or the like.

The processor 101 corresponds to a central part of a computer that executes a process such as a calculation and a control required for an operation of the reading apparatus 100. The processor 101 loads various programs stored in the ROM 102, the storage device 111, or the like to the RAM 103. The processor 101 implements respective units described below and executes various processes by executing the programs loaded to the RAM 103.

The processor 101 is, for example, a central processing unit (CPU), a micro processing unit (MPU), a system on a chip (SoC), a digital signal processor (DSP), a graphics processing unit (GPU), an application specific integrated circuit (ASIC), a programmable logic device (PLD), or a field-programmable gate array (FPGA). The processor 101 may be configured with a combination of a plurality of units among the above-described examples.

The ROM 102 corresponds to a main memory of a computer including the processor 101 as a central part. The ROM 102 is a nonvolatile memory used solely for reading data. The ROM 102 stores the above-described programs. In addition, the ROM 102 stores data or various set values that are used for the processor 101 to execute various processes.

The RAM 103 corresponds to a main memory of the computer including the processor 101 as a central part. The RAM 103 is a memory used for reading and writing data. The RAM 103 may be, for example, a work area that temporarily stores data used for the processor 101 to execute various processes. The RAM 103 is an example of a storage unit (storage).

The first connection interface 104 is an interface for allowing the reading apparatus 100 to communicate with the driving apparatus 200.

The second connection interface 105 is an interface for allowing the reading apparatus 100 to communicate with the terminal 400.

The high-frequency front end unit 106 outputs a high-frequency signal to the antenna 300. The high-frequency front end unit 106 inputs the high-frequency signal from the antenna 300.

The digital amplitude modulation unit 107 is a circuit that adds data to be transmitted to the wireless tag 600 to a carrier wave to be transmitted to the wireless tag 600.

The DA conversion unit 108 is a circuit that converts a digital signal into an analog signal. The DA conversion unit 108 converts the digital signal that is modulated by the digital amplitude modulation unit 107 into an analog signal. The DA conversion unit 108 outputs the high-frequency signal to the antenna 300 through the high-frequency front end unit 106.

The AD conversion unit 109 is a circuit that converts an analog signal into a digital signal. The AD conversion unit 109 converts the high-frequency signal input from the antenna 300 through the high-frequency front end unit 106 into a digital signal.

The demodulation unit 110 is a circuit that acquires information based on the radio wave from the wireless tag 600 that is received from the antenna 300. For example, the demodulation unit 110 acquires information stored in the wireless tag 600 from the digital signal converted by the AD conversion unit 109 using a well-known technique. The demodulation unit 110 is an example of the information acquisition unit configured to acquire information stored in the wireless tag 600 based on the radio wave from the wireless tag 600. The acquisition of information stored in the wireless tag 600 based on the radio wave from the wireless tag 600 is an example of reading information from the wireless tag 600 based on the radio wave from the wireless tag 600.

The demodulation unit 110 is also a circuit that measures tag data based on the radio wave from the wireless tag 600 that is received from the antenna 300. The demodulation unit 110 can measure a phase of a radio wave in a time series manner from the digital signal converted by the AD conversion unit 109 using a well-known technique. The demodulation unit 110 is an example of a measurement unit configured to measure a phase of a radio wave based on the radio wave from the wireless tag 600 that is received from the antenna 300. The demodulation unit 110 can measure a received signal strength indicator of a radio wave in a time series manner from the digital signal converted by the AD conversion unit 109 using a well-known technique. The demodulation unit 110 is an example of a measurement unit configured to measure a received signal strength indicator of a radio wave based on the radio wave from the wireless tag 600 that is received from the antenna 300.

The storage device 111 is a device configured with a nonvolatile memory that stores data, a program, and the like. The storage device 111 is configured with a hard disk drive (HDD), a solid state drive (SSD), or the like but is not limited thereto. The storage device 111 is an example of the storage unit.

The storage device 111 includes a first measurement data storage area 1111. The first measurement data storage area 1111 stores first measurement data. The first measurement data is data that is measured by the demodulation unit 110 based on a control of a first measurement process by a measurement control unit 1011 described below. The first measurement process is measurement of tag data of the one or more target wireless tags that is accompanied by movement of the position of the antenna 300 at a first moving speed. The measurement of the tag data of the one or more target wireless tags includes measurement of tag data of all or a part of the one or more target wireless tags. The first measurement process is an example of a measurement process as the measurement of the tag data of the one or more target wireless tags that is accompanied by the movement of the position of the antenna 300. The first moving speed is an example of a moving speed of the position of the antenna 300. The moving speed corresponds to a scanning speed. The first measurement process is measurement of tag data for acquiring the number of the one or more target wireless tags.

The first measurement data includes a first tag data set for each of target wireless tags for which the tag data is measured by the demodulation unit 110 among the one or more target wireless tags. The demodulation unit 110 also measures tag data of at least one of all of the one or more target wireless tags. In this example, the first measurement data includes the first tag data set for each of all of the one or more target wireless tags. The demodulation unit 110 also measures tag data of at least one of a part of the one or more target wireless tags. In this example, the first measurement data includes the first tag data set for each of a part of the one or more target wireless tags.

The first tag data set is a set including one or more pieces of tag data of the target wireless tag that is measured by the demodulation unit 110. The first tag data set includes one or more pieces of tag data at one or more positions among a plurality of positions of the antenna 300. Depending on the target wireless tag, the demodulation unit 110 may measure tag data at all of the plurality of positions of the antenna 300. In this example, the first tag data set includes tag data correlated with each of all of the plurality of positions of the antenna 300. Depending on the target wireless tag, the demodulation unit 110 may measure tag data at only a part of the plurality of positions of the antenna 300. In this example, the first tag data set includes tag data correlated with each of a part of the plurality of positions of the antenna 300. The first measurement data can be updated for each first measurement process. A configuration example of the first measurement data will be described in detail below.

The storage device 111 includes a second measurement data storage area 1112. The second measurement data storage area 1112 stores second measurement data. The second measurement data is data that is measured by the demodulation unit 110 based on a control of a second measurement process by a measurement control unit 1011 described below. The second measurement process is measurement of tag data of the one or more target wireless tags that is accompanied by movement of the position of the antenna 300 at a second moving speed. The second measurement process is an example of a measurement process as the measurement of the tag data of the one or more target wireless tags that is accompanied by the movement of the position of the antenna 300. The second moving speed is an example of a moving speed of the position of the antenna 300. The second measurement process is a process after the first measurement process.

The second measurement data includes a second tag data set for each of target wireless tags for which the tag data is measured by the demodulation unit 110 among the one or more target wireless tags. The demodulation unit 110 also measures tag data of at least one of all of the one or more target wireless tags. In this example, the second measurement data includes the second tag data set for each of all of the one or more target wireless tags. The demodulation unit 110 also measures tag data of at least one of a part of the one or more target wireless tags. In this example, the second measurement data includes the second tag data set for each of a part of the one or more target wireless tags.

The second tag data set is a set including one or more pieces of tag data of the target wireless tag that is measured by the demodulation unit 110. The second tag data set includes one or more pieces of tag data at one or more positions among a plurality of positions of the antenna 300. Depending on the target wireless tag, the demodulation unit 110 may measure tag data at all of the plurality of positions of the antenna 300. In this example, the second tag data set includes tag data correlated with each of all of the plurality of positions of the antenna 300. Depending on the target wireless tag, the demodulation unit 110 may measure tag data at only a part of the plurality of positions of the antenna 300. In this example, the second tag data set includes tag data correlated with each of a part of the plurality of positions of the antenna 300. The second measurement data can be updated for each second measurement process. A configuration example of the second measurement data will be described in detail below.

The storage device 111 includes a speed data storage area 1113. The speed data storage area 1113 stores speed data. The speed data is data regarding a plurality of moving speeds correlated with a plurality of steps of the number of tags. Each of the plurality of moving speeds is a moving speed of the position of the antenna 300. The speed data can be appropriately updated. A configuration example of the speed data will be described below.

The storage device 111 stores a learned model storage area 1114. The learned model storage area 1114 stores a learned model used for determining a range where each of the one or more target wireless tags is present. The learned model outputs output data for determination based on an input of input data for determination. The input data for determination is the second tag data set of the target wireless tag. The output data for determination is data representing the range where the target wireless tag is present. The data representing the range where the target wireless tag is present includes data representing whether the position of the target wireless tag is included in the first range or the second range. The learned model is a model generated by machine learning based on learning data described below. The expression "generation" includes not only an aspect of new generation but also an aspect of update.

The learning data includes a plurality of tag data sets for learning for a plurality of wireless tags for learning that are measured in advance by a communication apparatus. Here, in order to simplify the description, in the description, the communication apparatus for measuring the plurality of tag data sets for learning is assumed to be the communication apparatus 10 but may be the same kind of communication apparatus as the communication apparatus 10.

The tag data set for learning is a set including one or more pieces of tag data of the wireless tag for learning that are measured by the communication apparatus 10. The tag data set for learning includes one or more pieces of tag data at one or more positions among a plurality of positions of the antenna 300. Depending on the wireless tag for learning, the communication apparatus 10 may measure tag data at all of the plurality of positions of the antenna 300. In this example, the tag data set for learning includes tag data correlated with each of all of the plurality of positions of the antenna 300. Depending on the wireless tag for learning, the communication apparatus 10 may measure tag data at only a part of the plurality of positions of the antenna 300. In this example, the tag data set for learning includes tag data correlated with each of a part of the plurality of positions of the antenna 300.

The learning data includes data representing a range where each of the plurality of wireless tags for learning is present. Hereinafter, the data representing the range where each of the plurality of wireless tags for learning is present will also be referred to as correct data. The correct data includes data representing whether the position of the wireless tag for learning is included in the first range or the second range. The correct data is data input by a user. A plurality of correct data for the plurality of wireless tags for learning are correlated with the plurality of tag data sets for learning for the plurality of wireless tags for learning, respectively. The learning data can be appropriately updated.

For example, the processor 101 generates a learned model by machine learning based on learning data. For each of the plurality of wireless tags for learning, the processor 101 estimates a relationship between the tag data set for learning and the data representing the range where the wireless tag for learning is present. The processor 101 generates a learned model based on the estimation. The machine learning is a neural network or the like but is not limited thereto. Irrespective of whether the tag data of the wireless tag for learning is a phase or a received signal strength indicator, the distance between the antenna 300 and the wireless tag for learning changes. A pattern of the tag data set for learning varies depending on the position of the wireless tag for learning. A given correlation may be satisfied between the tag data set for learning and the position of the wireless tag for learning.

The bus 112 includes a control bus, an address bus, and a data bus. The bus 112 transmits signals that are transmitted and received between the respective units of the reading apparatus 100.

The hardware configuration of the reading apparatus 100 is not limited to the above-described configuration. For the reading apparatus 100, the components described above can be removed or modified and a new component can be added.

Each of the units implemented by the processor 101 will be described.

The processor 101 implements the measurement control unit 1011, an acquisition unit 1012, a setting unit 1013, and a determination processing unit 1014. Each of the units implemented by the processor 101 can also be referred to as each of the functions. Each of the units implemented by the processor 101 can also be implemented by the control unit including the processor 101, the ROM 102, and the RAM 103.

The measurement control unit 1011 controls the measurement process based on reception of radio waves from the one or more target wireless tags by the antenna 300. As the measurement process, the measurement control unit 1011 controls the measurement of the tag data of the one or more target wireless tags that is accompanied by the movement of the position of the antenna 300. The radio waves from the one or more target wireless tags include radio waves of all or a part of the one or more target wireless tags. For example, the measurement control unit 1011 controls the movement of the position of the antenna 300 by controlling the driving apparatus 200. The measurement control unit 1011 controls the measurement of the tag data of the one or more target wireless tags by the demodulation unit 110 based on the radio waves from the one or more target wireless tags that are received by the moving antenna 300.

As the first measurement process, the measurement control unit 1011 controls the measurement of the tag data of the one or more target wireless tags that is accompanied by the movement of the position of the antenna 300 at the first moving speed. The first moving speed is higher than or equal to the highest moving speed among the plurality of moving speeds represented by the speed data. As the second measurement process, the measurement control unit 1011 controls the measurement of the tag data of the one or more target wireless tags that is accompanied by the movement of the position of the antenna 300 at the second moving speed. The second moving speed is a moving speed that is set by the setting unit 1013 described below.

The acquisition unit 1012 acquires the number of the one or more target wireless tags based on the first measurement process controlled by the measurement control unit 1011. For example, the acquisition unit 1012 counts the number of the target wireless tags for which at least one tag data is measured based on the first measurement data measured in the first measurement process. The number of the target wireless tags for which at least one tag data is measured corresponds to the number of the first tag data sets in the first measurement data. The acquisition unit 1012 acquires the number of the one or more target wireless tags based on the count of the number of the target wireless tags. The acquisition of the number of the one or more target wireless tags includes the estimation of the number of the one or more target wireless tags. The acquisition unit 1012 does not need to accurately acquire the number of the one or more target wireless tags, and may approximately acquire the number of the one or more target wireless tags. Hereinafter, the number of the one or more target wireless tags acquired by the acquisition unit 1012 will also be referred to as the number of the tags acquired.

The setting unit 1013 sets the second moving speed based on the number of the tags acquired. The setting unit 1013 sets the second moving speed so as to delay the moving speed of the antenna 300 as the number of the tags acquired increases. For example, the setting unit 1013 sets the second moving speed based on the speed data stored in the speed data storage area 1113. The setting unit 1013 acquires moving speed correlated with a step including the number of the tags acquired among the plurality of steps of the number of tags based on the speed data. The setting unit 1013 sets the second moving speed to the acquired moving speed.

The determination processing unit 1014 determines the range where each of the one or more target wireless tags is present. For example, the determination processing unit 1014 inputs the input data for determination for each of the one or more target wireless tags to the learned model. The input data for determination is the second tag data set of the target wireless tag. The determination processing unit 1014 acquires the output data for determination for each of the one or more target wireless tags from the learned model based on the input of the input data for determination for each of the one or more target wireless tags to the learned model. The output data for determination is data representing the range where the target wireless tag is present.

Figure 3:
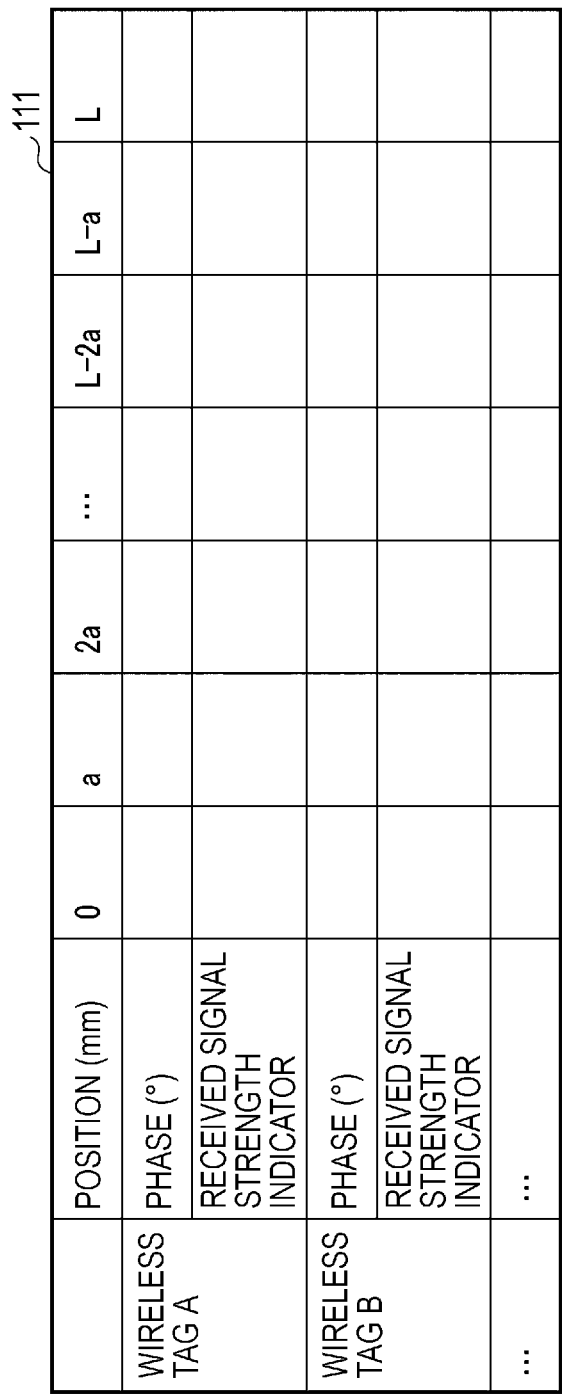
FIG. 3 is a diagram illustrating an example of a data structure configuring first measurement data.

FIG. 3 is a diagram illustrating an example of a data structure configuring the first measurement data.

The first measurement data includes the first tag data set for each of the target wireless tags. The first tag data set includes one or more pieces of tag data at one or more positions among a plurality of positions of the antenna 300. The plurality of positions of the antenna 300 are a plurality of positions in the moving range of the antenna 300. For example, the plurality of positions of the antenna 300 include positions provided at given intervals a between the position 0 to the position L. The value of the given interval a can be appropriately set. Depending on the target wireless tag, the communication apparatus 10 can also measure tag data for all of the positions provided at the given intervals a between the position 0 to the position L. Depending on the target wireless tag, the communication apparatus 10 can also measure tag data for only a part of the positions provided at the given intervals a between the position 0 to the position L. The plurality of positions of the antenna 300 may include one or more positions different from the positions provided at the given intervals a between the position 0 to the position L. The second measurement data may be configured with the same data structure as that of the first measurement data.

FIG. 4 is a diagram illustrating an example of a data structure configuring the speed data.

The speed data includes the plurality of steps of the number of tags. The step includes a range of the number of tags. A case where the number of the steps is three is described as an example but is not limited thereto. The number of the steps only needs to be plural and may be 2 or may be 4 or more. The number of tags is represented by N.

The first step is a step where the range of the number of tags is N<20. The second step is a step where the range of the number of tags is 20 N<30. The third step is a step where the range of the number of tags is 30 N. The range of the number of tags set in each of the steps is exemplary and is not limited to this example.

The speed data includes a plurality of moving speeds correlated with a plurality of steps of the number of tags. The moving speed is a speed close to an upper limit value at which a large amount of tag data can be acquired for each of the target wireless tags corresponding to the number of tags in the correlated step. The plurality of moving speeds are correlated with the plurality of steps so as to be delayed as the number of tags increases. The reason for this is, with a good balance, to allow the communication apparatus 10 to measure tag data at a larger number of positions among the plurality of positions of the antenna 300 and to reduce the measurement time. The communication apparatus 10 has an upper limit in the number of pieces of tag data that can be measured per unit time. By delaying the moving speed of the antenna 300 as the number of tags increases, the communication apparatus 10 can measure tag data at a larger number of positions among the plurality of positions of the antenna 300. By measuring tag data at a larger number of positions for the target wireless tags, the communication apparatus 10 can improve the determination accuracy in the range where the target wireless tag is present. The moving speed correlated with the first step is 30 [mm/s]. The moving speed correlated with the second step is 15 [mm/s]. The moving speed correlated with the third step is 5 [mm/s]. This way, the moving speed is set so as to be delayed as the number of tags set in each of the plurality of steps of the number of tags increases.

The driving apparatus 200 will be described using FIGS. 5 and 6.

Figure 5:
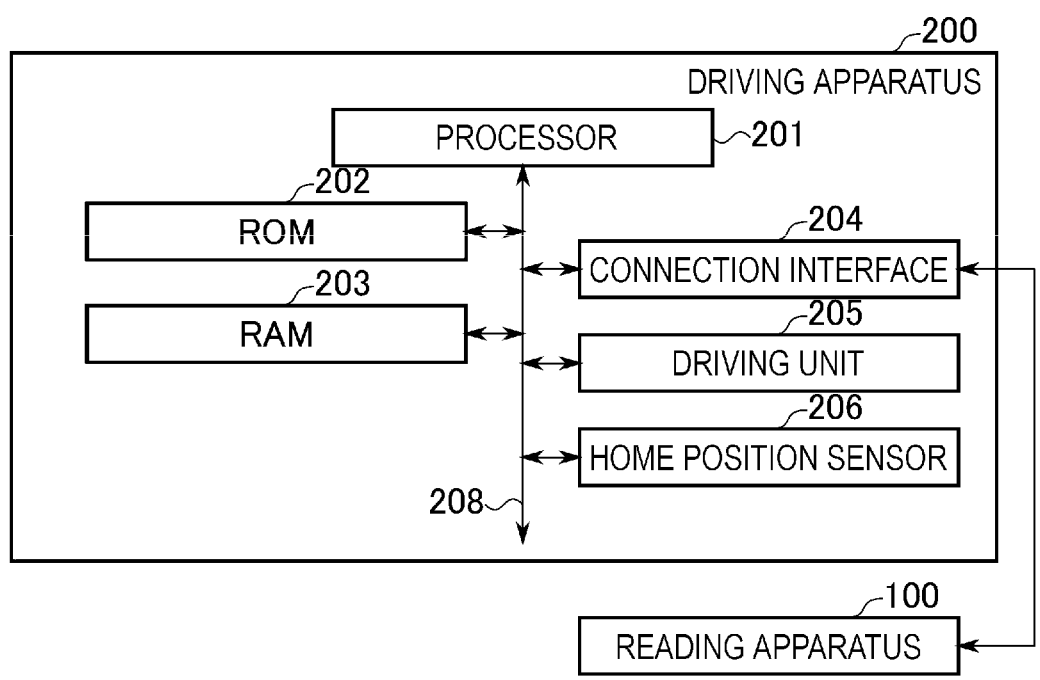
FIG. 5 is a block diagram illustrating an example of a configuration of a driving apparatus.

FIG. 5 is a block diagram illustrating an example of a configuration of the driving apparatus 200.

The driving apparatus 200 includes a processor 201, a ROM 202, a RAM 203, a connection interface 204, a driving unit 205, and a home position sensor 206. The respective units in the driving apparatus 200 are connected to each other through a bus 208 or the like.

The processor 201 corresponds to a central part of a computer that executes a process such as a calculation and a control required for an operation of the driving apparatus 200. The processor 201 loads various programs stored in the ROM 202 or the like to the RAM 203. The processor 201 executes various operations by executing the programs loaded to the RAM 203. The processor 201 is, for example, a CPU, an MPU, an SoC, a DSP, a GPU, an ASIC, a PLD, or an FPGA. The processor 201 may be configured with a combination of a plurality of units among the above-described examples.

The ROM 202 corresponds to a main memory of a computer including the processor 201 as a central part. The ROM 202 is a nonvolatile memory used solely for reading data. The ROM 202 stores the above-described programs. The ROM 202 stores data or various set values that are used for the processor 201 to execute various processes.

The RAM 203 corresponds to a main memory of the computer including the processor 201 as a central part. The RAM 203 is a memory used for reading and writing data. The RAM 203 may be, for example, a work area that temporarily stores data used for the processor 201 to execute various processes.

The connection interface 204 is an interface for allowing the driving apparatus 200 to be connected to the reading apparatus 100.

The driving unit 205 moves the antenna 300. For example, the driving unit 205 is a stepping motor.

The home position sensor 206 is a sensor that detects whether a moving stage 213 described below is present at a home position.

The bus 208 includes a control bus, an address bus, and a data bus. The bus 208 transmits signals that are transmitted and received between the respective units of the driving apparatus 200.

Figure 6:
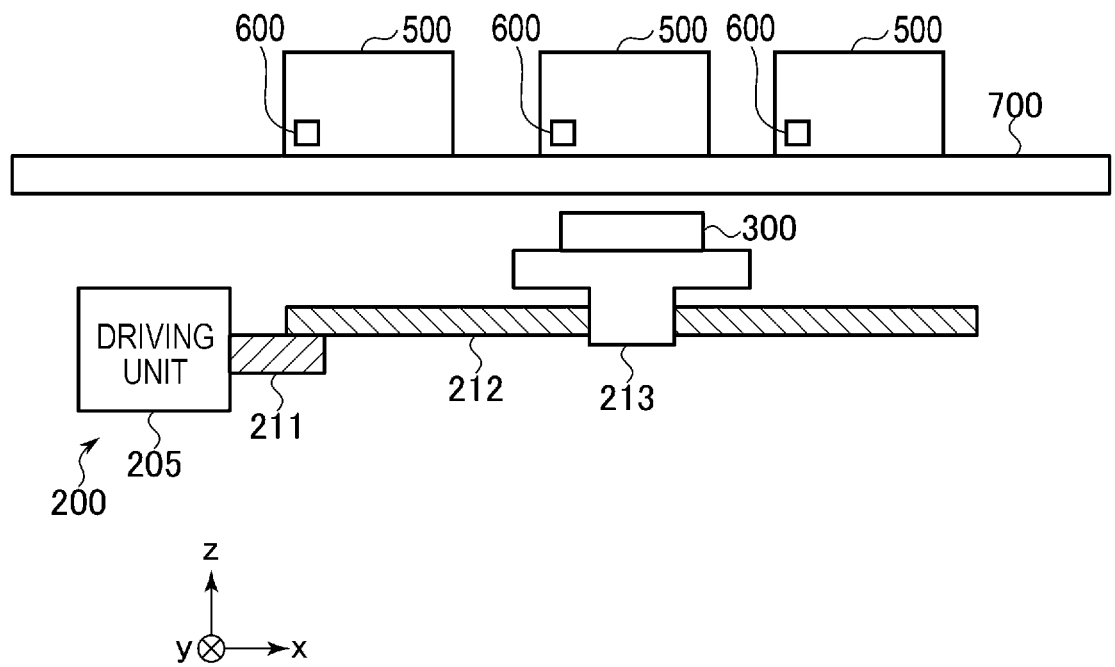
FIG. 6 is a schematic diagram illustrating the driving apparatus.

FIG. 6 is a schematic diagram illustrating the driving apparatus 200.

The driving apparatus 200 includes a rotation shaft 211, a rail 212, and the moving stage 213.

As illustrated in FIG. 6, the driving apparatus 200 and the antenna 300 are disposed below a counter top 700. The counter top 700 is a table having a horizontal surface on which the article 500 to which the wireless tag 600 is attached is mounted. The counter top 700 is an example of a mounting unit. The counter top 700 does not need to be included in the communication system 1 or the communication apparatus 10.

The rotation shaft 211 transmits a driving force of the driving unit 205. A groove of a screw is formed in the rotation shaft 211 and the rail 212. The grooves of the screws are connected to face each other. Therefore, if the driving unit 205 rotates, the rotation shaft 211 rotates, and the rail 212 moves. The moving stage 213 on which the antenna 300 is mounted is attached to the rail 212.

The moving stage 213 includes a ball screw nut and moves in the horizontal direction if the rail 212 rotates through the ball screw nut. That is, the moving stage 213 moves in a direction along an x-axis illustrated in FIG. 5. In addition, if the rotation direction of the rail 212 is reversed, the moving stage 213 moves in the opposite direction. This way, the driving apparatus 200 reciprocates the antenna 300 in the one direction of the x-axis along the rail 212.

The hardware configuration of the driving apparatus 200 is not limited to the above-described configuration. For the driving apparatus 200, the components described above can be removed or modified and a new component can be added.

The first range and the second range will be described below.

Figure 7:
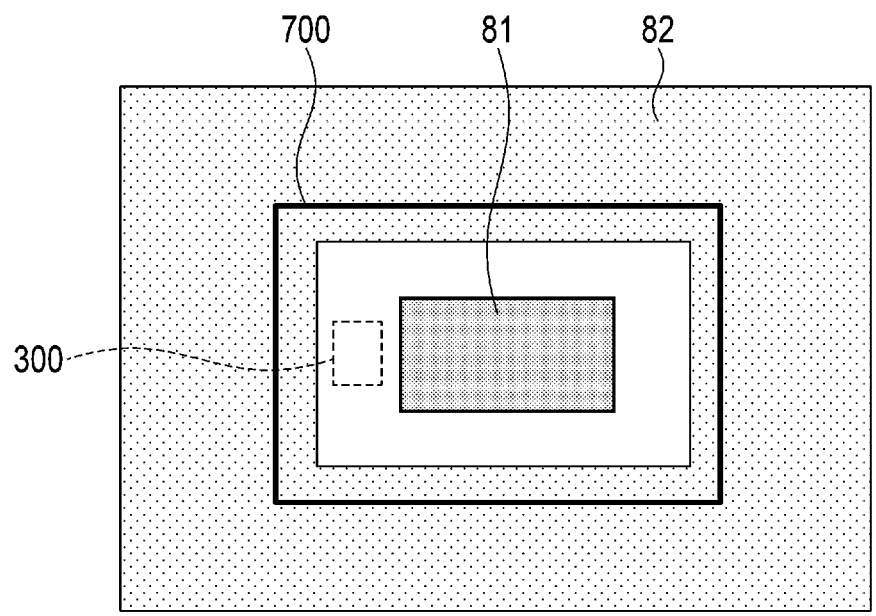
FIG. 7 is a schematic diagram illustrating a first range and a second range.

FIG. 7 is a schematic diagram illustrating a first range 81 and a second range 82. FIG. 7 is a plan view illustrating the counter top 700 when seen from the top.

The first range 81 and the second range 82 are ranges that are separated in the horizontal direction. The first range 81 is a range set in a center portion of the horizontal surface of the counter top 700. The second range 82 is a range set in an outer circumference portion of the horizontal surface of the counter top 700 and a portion outside the counter top 700 in the horizontal direction. The second range 82 is set so as to surround the first range 81. In FIG. 7, the second range 82 is set to be spaced from the first range 81 without being adjacent to the first range 81. However, the embodiment is not limited to this example. The second range 82 may be adjacent to the first range 81.

The setting of the first range 81 and the second range 82 are not limited to this example. The first range 81 may be a range set in a center portion of the horizontal surface of the counter top 700, and the second range 82 may be a range set in the outer circumference portion of the horizontal surface of the counter top 700. The first range 81 may be a range set in the entire horizontal surface of the counter top 700, and the second range 82 may be a range set in the portion outside the counter top 700 in the horizontal direction. The second range 82 is not limited to the range set to surround the first range 81.

The first range 81 and the second range 82 only need to be different ranges that do not overlap each other and are not limited to the ranges that are separated in the horizontal direction. The first range 81 and the second range 82 may be ranges that are separated in a vertical direction.

The first measurement process will be described.

Figure 8:
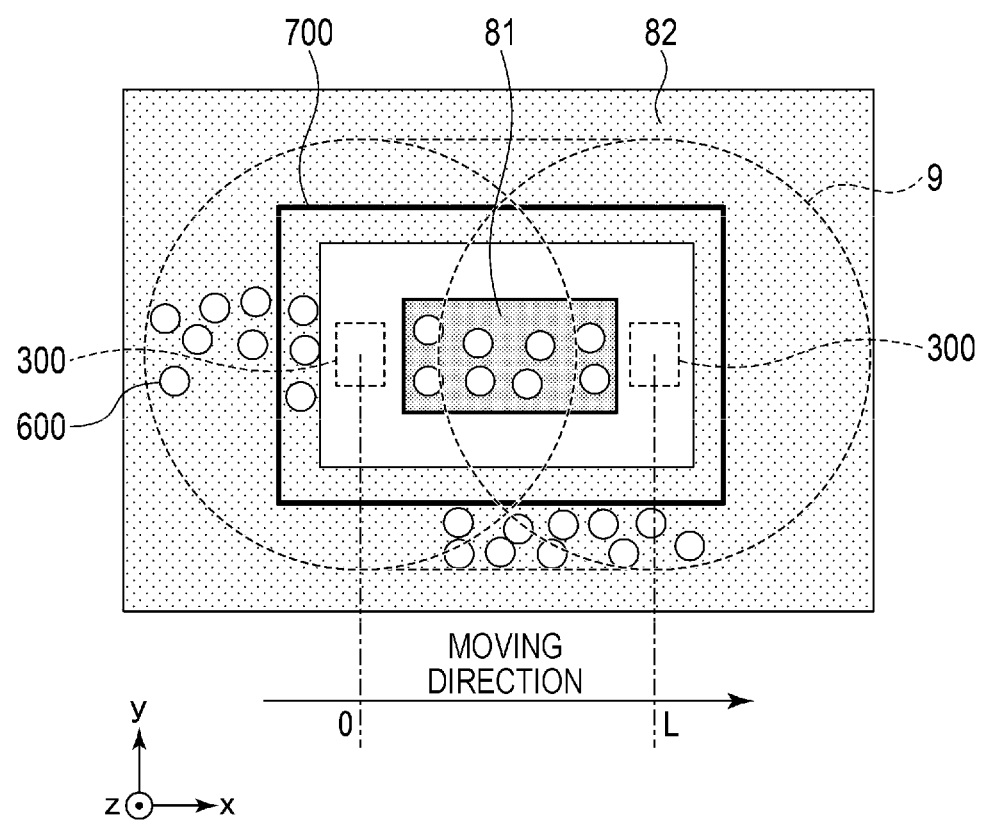
FIG. 8 is a diagram illustrating an example of a first measurement process by a processor of the reading apparatus.

FIG. 8 is a diagram illustrating an example of the first measurement process.

FIG. 8 is a plan view illustrating the counter top 700 when seen from the top.

The moving range of the antenna 300 is assumed to be the range in the one direction from the position 0 to the position L. It is assumed that a radiation range 9 in the moving range of the antenna 300 may include 27 target wireless tags as an example of the one or more target wireless tags. Among the 27 target wireless tags, 8 target wireless tags are included in the first range. Among the 27 target wireless tags, 19 target wireless tags are included in the second range.

As the first measurement process, the measurement control unit 1011 controls the measurement of the tag data of the one or more target wireless tags that is accompanied by the movement of the position of the antenna 300 at the first moving speed. The demodulation unit 110 measures tag data of all or a part of the 27 target wireless tags based on the control of the first measurement process by the measurement control unit 1011. For example, the demodulation unit 110 also measures tag data of at least one of all of the 27 target wireless tags. The demodulation unit 110 also measures tag data of at least one of a part of the 27 target wireless tags. The acquisition unit 1012 acquires the number of the one or more target wireless tags based on the first measurement process controlled by the measurement control unit 1011. For example, the acquisition unit 1012 may acquire 27 or may acquire a number of less than 27 as the number of the one or more target wireless tags.

Operation Example

Next, the process by the processor 101 of the reading apparatus 100 configured as described above will be described.

The procedure described below is merely exemplary and may be changed as long as each of the processes can be executed. In addition, in the procedure described below, steps can be omitted, replaced, and added depending on embodiments.

Figure 9:
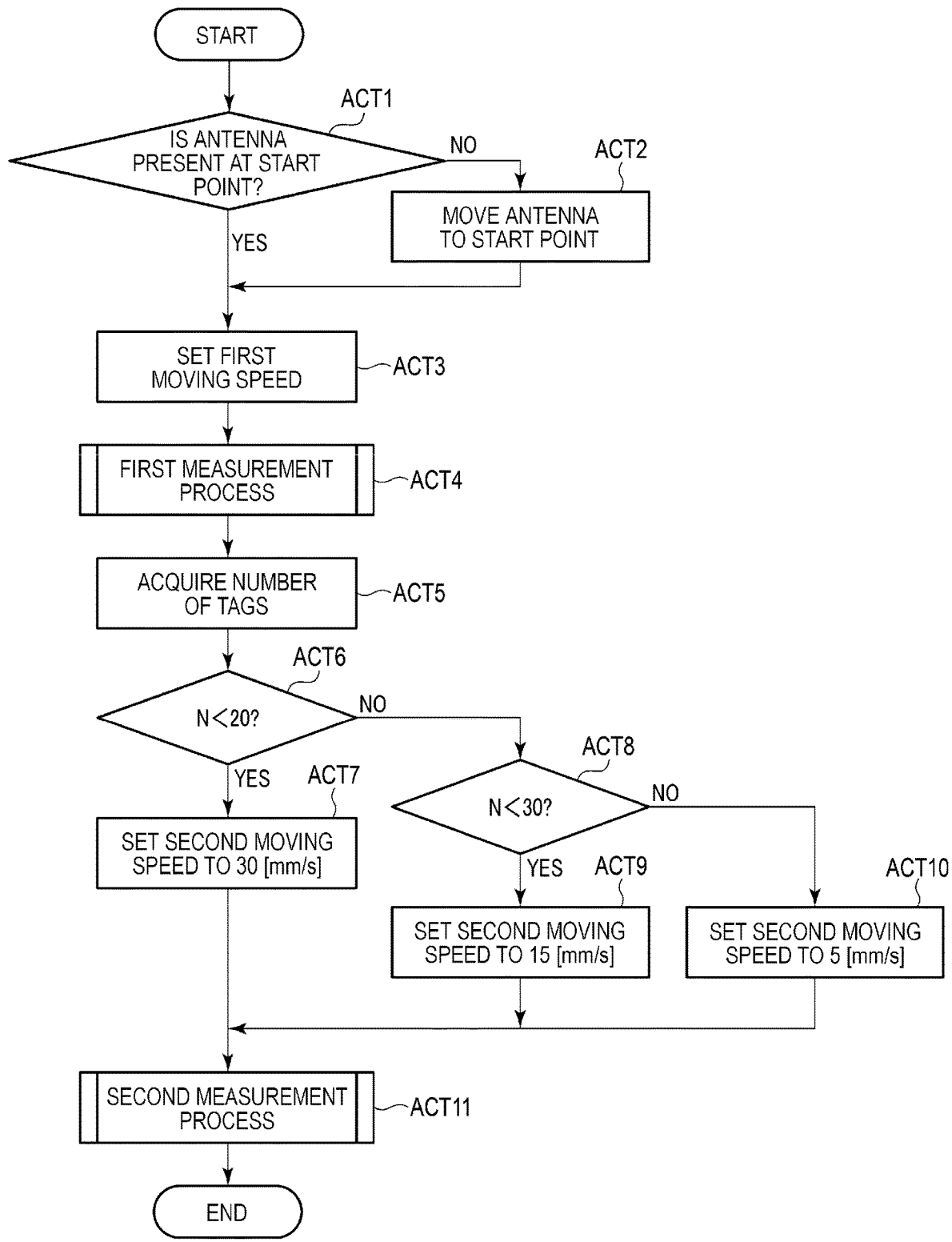
FIG. 9 is a flowchart illustrating an example of the process by the processor of the reading apparatus.

FIG. 9 is a flowchart illustrating an example of the process by the processor 101 of the reading apparatus 100.

For example, one or more articles 500 to which the one or more target wireless tags are attached are mounted on the counter top 700. The one or more target wireless tags are not limited to those mounted on the counter top 700. A part of the one or more target wireless tags may be present in the vicinity of the counter top 700.

The processor 101 of the reading apparatus 100 may start the process based on acquisition of a start instruction of the process input by a user through the terminal 400.

The measurement control unit 1011 determines whether the antenna 300 is present at a start point (ACT 1). The start point is a point of the position 0 corresponding to the home position. If the antenna 300 is not present at the start point (ACT 1, NO), the process proceeds from ACT 1 to ACT 2.

If the antenna 300 is present at the start point (ACT 1, YES), the process proceeds from ACT 1 to ACT 3.

The measurement control unit 1011 controls the movement of the position of the antenna 300 to the start point (ACT 2). In ACT 2, for example, the measurement control unit 1011 transmits a movement instruction to the driving apparatus 200. The movement instruction may be an instruction to move the position of the antenna 300 to the start point. The processor 201 of the driving apparatus 200 receives a first movement instruction from the reading apparatus 100. The processor 201 controls the driving unit 205 such that the position of the antenna 300 moves to the position 0 based on the first movement instruction. The driving unit 205 moves the position of the antenna 300 to the position 0 based on the control by the processor 201.

The measurement control unit 1011 sets the first moving speed as the moving speed of the position of the antenna 300 (ACT 3).

The measurement control unit 1011 controls the first measurement process in the moving range of the antenna 300 (ACT 4). In ACT 4, for example, the measurement control unit 1011 controls the measurement of the tag data of the one or more target wireless tags that is accompanied by the movement of the position of the antenna 300 at the first moving speed. A process example of the first measurement process will be described below.

The acquisition unit 1012 acquires the number of the one or more target wireless tags based on the first measurement process controlled by the measurement control unit 1011 (ACT 5). As described below as an example in the following process, the setting unit 1013 sets the second moving speed based on the number of the tags acquired.

The setting unit 1013 determines whether the number of the tags acquired is less than 20 (ACT 6). In ACT 6, for example, the setting unit 1013 determines whether the number of the tags acquired is included in the first step among the plurality of moving speeds represented by the speed data. If the number of the tags acquired is less than 20, the setting unit 1013 determines that the number of the tags acquired is included in the first step. If the number of the tags acquired is not less than 20, the setting unit 1013 determines that the number of the tags acquired is not included in the first step. If the number of the tags acquired is less than 20 (ACT 6, YES), the process proceeds from ACT 6 to ACT 7. If the number of the tags acquired is not less than 20 (ACT 6, NO), the process proceeds from ACT 6 to ACT 8.

The setting unit 1013 sets the second moving speed to 30 [mm/s] (ACT 7). In ACT 7, for example, the setting unit 1013 acquires the moving speed of 30 [mm/s] correlated with the first step including the number of the tags acquired based on the speed data. The setting unit 1013 sets the second moving speed to the acquired moving speed of 30 [mm/s].

The setting unit 1013 determines whether the number of the tags acquired is less than 30 (ACT 8). In ACT 8, for example, the setting unit 1013 determines whether the number of the tags acquired is included in the second step among the plurality of moving speeds represented by the speed data. If the number of the tags acquired is less than 30, the setting unit 1013 determines that the number of the tags acquired is included in the second step. If the number of the tags acquired is not less than 30, the setting unit 1013 determines that the number of the tags acquired is not included in the second step. If the number of the tags acquired is not less than 30, the setting unit 1013 determines that the number of the tags acquired is included in the third step. If the number of the tags acquired is less than 30 (ACT 8, YES), the process proceeds from ACT 8 to ACT 9. If the number of the tags acquired is not less than 30 (ACT 8, NO), the process proceeds from ACT 8 to ACT 10.

The setting unit 1013 sets the second moving speed to 15 [mm/s] (ACT 9). In ACT 9, for example, the setting unit 1013 acquires the moving speed of 15 [mm/s] correlated with the second step including the number of the tags acquired based on the speed data. The setting unit 1013 sets the second moving speed to the acquired moving speed of 15 [mm/s].

The setting unit 1013 sets the second moving speed to 5 [mm/s] (ACT 10). In ACT 10, for example, the setting unit 1013 acquires the moving speed of 5 [mm/s] correlated with the third step including the number of the tags acquired based on the speed data. The setting unit 1013 sets the second moving speed to the acquired moving speed of 5 [mm/s].

The measurement control unit 1011 controls the second measurement process in the moving range of the antenna 300 (ACT 11). In ACT 11, for example, the measurement control unit 1011 controls the measurement of the tag data of the one or more target wireless tags that is accompanied by the movement of the position of the antenna 300 at the second moving speed. A process example of the second measurement process will be described below.

Figure 10:
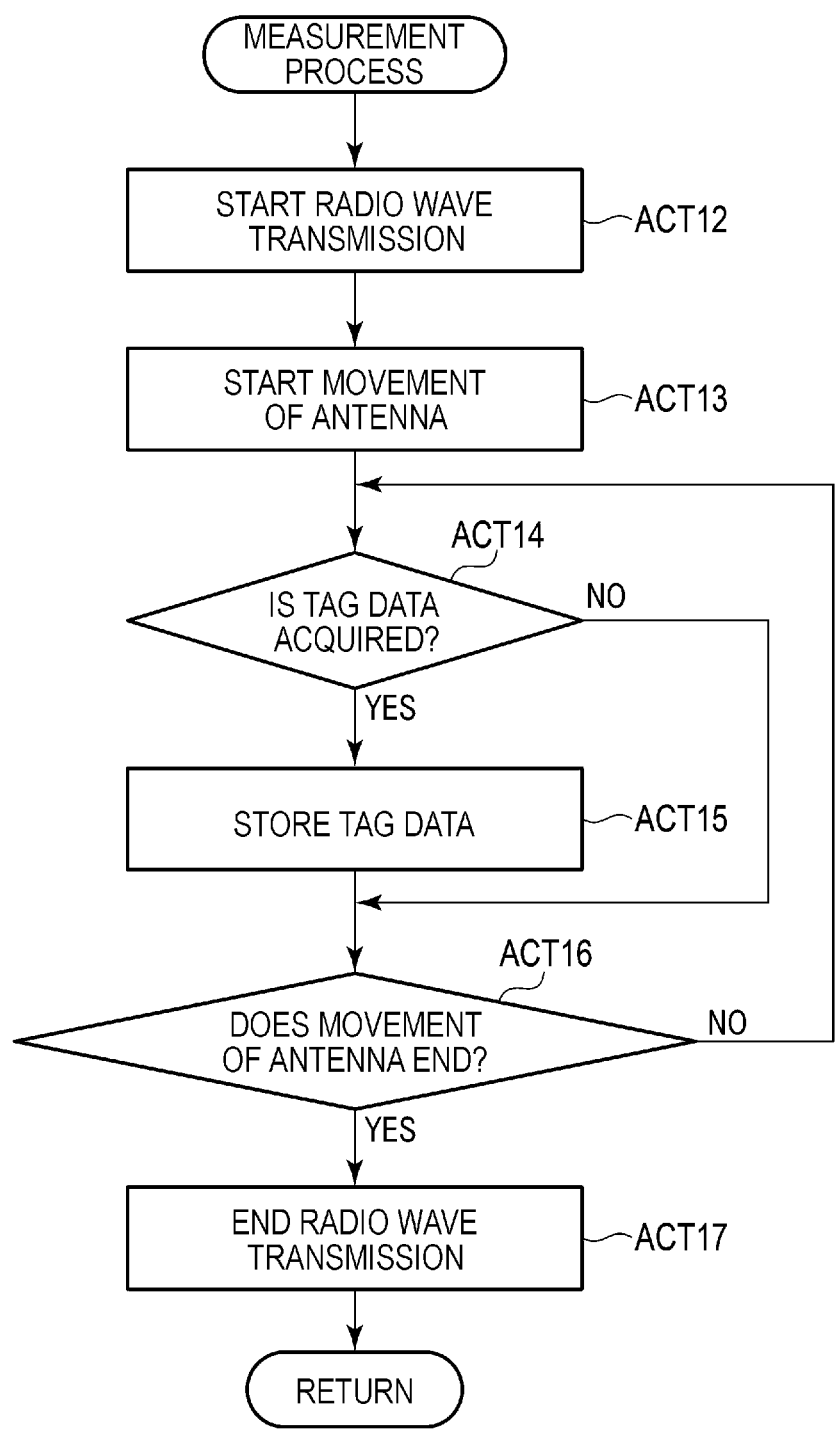
FIG. 10 is a flowchart illustrating an example of the measurement process by the processor of the reading apparatus.

FIG. 10 is a flowchart illustrating an example of the measurement process by the processor 101 of the reading apparatus 100.

First, the process example of the first measurement process in ACT 4 will be described with reference to FIG. 10.

The measurement control unit 1011 controls the start of radio wave transmission from the antenna 300 (ACT 12). In ACT 12, for example, the measurement control unit 1011 controls the start of radio wave transmission from the antenna 300 at the point of the position 0. The antenna 300 starts the radio wave transmission.

The measurement control unit 1011 controls the movement of the position of the antenna 300 at the first moving speed in the moving range of the antenna 300 (ACT 13). In ACT 13, for example, the measurement control unit 1011 starts the movement of the position of the antenna 300 at the first moving speed by transmitting the first movement instruction to the driving apparatus 200. The first movement instruction is an instruction to move the antenna 300 at the first moving speed in the moving range of the antenna 300. The first movement instruction may be an instruction to move the antenna 300 at the first moving speed in the one direction from the position 0 to the position L. The antenna 300 moves the moving range of the antenna 300 while transmitting a radio wave. Here, the antenna 300 moves from the position 0 to the position L while transmitting a radio wave. However, the embodiment is not limited to this example. The processor 201 of the driving apparatus 200 receives the first movement instruction from the reading apparatus 100. The processor 201 controls the driving unit 205 to move the position of the antenna 300 at the first moving speed in the one direction from the position 0 to the position L. The driving unit 205 moves the position of the antenna 300 at the first moving speed in the one direction from the position 0 to the position L based on the control by the processor 201.

The measurement control unit 1011 determines whether tag data measured by the demodulation unit 110 is acquired for any target wireless tag among the one or more target wireless tags (ACT 14). If the measurement control unit 1011 acquires the tag data (ACT 14, YES), the process proceeds from ACT 14 to ACT 15. If the measurement control unit 1011 does not acquire the tag data (ACT 14, NO), the process proceeds from ACT 14 to ACT 16.

The measurement control unit 1011 stores the acquired tag data in the first measurement data storage area 1111 (ACT 15). In ACT 15, for example, the measurement control unit 1011 correlates the tag data with the measured position of the antenna 300 and stores the correlated data in the first measurement data storage area 1111. The measurement control unit 1011 can acquire the position of the antenna 300 in cooperation with the driving apparatus 200.

The measurement control unit 1011 determines whether the movement of the position of the antenna 300 ends (ACT 16). In ACT 16, for example, the measurement control unit 1011 determines whether the movement of the position of the antenna 300 at the first moving speed in the moving range of the antenna 300 ends. The measurement control unit 1011 may determine that the movement of the position of the antenna 300 ends based on a movement end notification from the driving apparatus 200. The movement end notification may notify that the movement of the position of the antenna 300 ends in response to arrival at the position L. If the movement of the position of the antenna 300 ends (ACT 16, YES), the process proceeds from ACT 16 to ACT 17. If the movement of the position of the antenna 300 does not end (ACT 16, NO), the process proceeds from ACT 16 to ACT 14.

The measurement control unit 1011 repeats the processes of ACT 14 and ACT 15 until the movement of the position of the antenna 300 at the first moving speed in the moving range of the antenna 300 ends from the start.

By repeating the process of ACT 14, the measurement control unit 1011 acquires at least one tag data measured by the demodulation unit 110 for each of all or a part of the one or more target wireless tags. The measurement control unit 1011 acquires one or more pieces of tag data at one or more positions among the plurality of positions of the antenna 300 for each of the target wireless tags for which at least one tag data is measured by the demodulation unit 110.

By repeating the process of ACT 15, the measurement control unit 1011 stores the first tag data set in the first measurement data storage area 1111 for each of the target wireless tags for which at least one tag data is measured by the demodulation unit 110.

The measurement control unit 1011 controls the end of radio wave transmission from the antenna 300 (ACT 17). In ACT 17, for example, the measurement control unit 1011 controls the end of radio wave transmission from the antenna 300 based on the end of the movement of the position of the antenna 300 at the first moving speed in the moving range of the antenna 300. The antenna 300 ends the radio wave transmission.

Next, the process example of the second measurement process in ACT 11 will be described with reference to FIG. 10.

The measurement control unit 1011 controls the start of radio wave transmission from the antenna 300 (ACT 12). In ACT 12, for example, the measurement control unit 1011 controls the start of radio wave transmission from the antenna 300 at the point of the position 0. The antenna 300 starts the radio wave transmission.

The measurement control unit 1011 controls the movement of the position of the antenna 300 at the second moving speed in the moving range of the antenna 300 (ACT 13). In ACT 13, for example, the measurement control unit 1011 starts the movement of the position of the antenna 300 at the second moving speed by transmitting a second movement instruction to the driving apparatus 200. The second movement instruction is an instruction to move the antenna 300 at the second moving speed in the moving range of the antenna 300. The second movement instruction may be an instruction to move the antenna 300 at the second moving speed in one direction from the position L to the position 0. The antenna 300 moves the moving range of the antenna 300 while transmitting a radio wave. Here, the antenna 300 moves from the position L to the position 0 while transmitting a radio wave. However, the embodiment is not limited to this example. The processor 201 of the driving apparatus 200 receives the second movement instruction from the reading apparatus 100. The processor 201 controls the driving unit 205 to move the position of the antenna 300 at the second moving speed in the one direction from the position L to the position 0. The driving unit 205 moves the position of the antenna 300 at the second moving speed in the one direction from the position L to the position 0 based on the control by the processor 201.

The measurement control unit 1011 determines whether tag data measured by the demodulation unit 110 is acquired for any target wireless tag among the one or more target wireless tags (ACT 14). If the measurement control unit 1011 acquires the tag data (ACT 14, YES), the process proceeds from ACT 14 to ACT 15. If the measurement control unit 1011 does not acquire the tag data (ACT 14, NO), the process proceeds from ACT 14 to ACT 16.

The measurement control unit 1011 stores the acquired tag data in the second measurement data storage area 1112 (ACT 15). In ACT 15, for example, the measurement control unit 1011 correlates the tag data with the measured position of the antenna 300 and stores the tag data in the second measurement data storage area 1112. The measurement control unit 1011 can acquire the position of the antenna 300 in cooperation with the driving apparatus 200.

The measurement control unit 1011 determines whether the movement of the position of the antenna 300 ends (ACT 16). In ACT 16, for example, the measurement control unit 1011 determines whether the movement of the position of the antenna 300 at the second moving speed in the moving range of the antenna 300 ends. The measurement control unit 1011 may determine that the movement of the position of the antenna 300 ends based on a movement end notification from the driving apparatus 200. The movement end notification may notify that the movement of the position of the antenna 300 ends in response to arrival at the position 0. If the movement of the position of the antenna 300 ends (ACT 16, YES), the process proceeds from ACT 16 to ACT 17. If the movement of the position of the antenna 300 does not end (ACT 16, NO), the process proceeds from ACT 16 to ACT 14.

The measurement control unit 1011 repeats the processes of ACT 14 and ACT 15 until the movement of the position of the antenna 300 at the second moving speed in the moving range of the antenna 300 ends from the start.

By repeating the process of ACT 14, the measurement control unit 1011 acquires at least one tag data measured by the demodulation unit 110 for each of all or a part of the one or more target wireless tags. The measurement control unit 1011 acquires one or more pieces of tag data at one or more positions among the plurality of positions of the antenna 300 for each of the target wireless tags for which at least one tag data is measured by the demodulation unit 110.

By repeating the process of ACT 15, the measurement control unit 1011 stores the second tag data set in the second measurement data storage area 1112 for each of the target wireless tags for which at least one tag data is measured by the demodulation unit 110.

The measurement control unit 1011 controls the end of radio wave transmission from the antenna 300 (ACT 17). In ACT 17, for example, the measurement control unit 1011 controls the end of radio wave transmission from the antenna 300 based on the end of the movement of the position of the antenna 300 at the second moving speed in the moving range of the antenna 300. The antenna 300 ends the radio wave transmission.

The determination process of the range where each of the one or more target wireless tags is present by the processor 101 of the reading apparatus 100 will be described. The processor 101 of the reading apparatus 100 may start the determination process after the control of the second measurement process in ACT 11. The processor 101 of the reading apparatus 100 may start the determination process based on acquisition of a start instruction of the determination process input by the user through the terminal 400.

Figure 11:
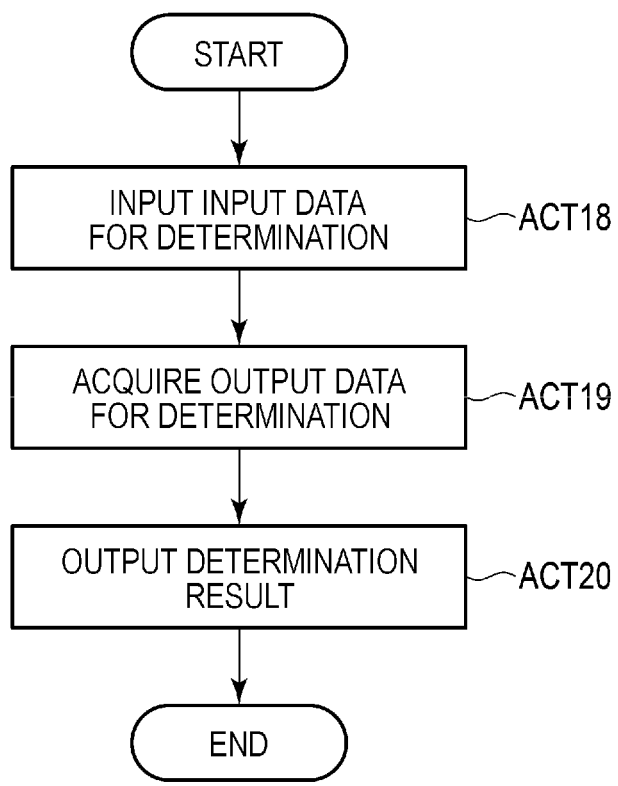
FIG. 11 is a flowchart illustrating an example of a determination process by the processor of the reading apparatus.

FIG. 11 is a flowchart illustrating an example of the determination process by the processor 101 of the reading apparatus 100.

The determination processing unit 1014 inputs the input data for determination for each of the one or more target wireless tags to the learned model (ACT 18). In ACT 18, for example, the determination processing unit 1014 acquires the second tag data set for each of the one or more target wireless tags based on the second measurement data stored in the second measurement data storage area 1112. The determination processing unit 1014 inputs the acquired the second tag data set to the learned model as the input data for determination.

The determination processing unit 1014 acquires the output data for determination for each of the one or more target wireless tags from the learned model (ACT 19).

The determination processing unit 1014 outputs the determination result to the terminal 400 (ACT 20). The determination result includes data representing the range where each of the one or more target wireless tags is present acquired by the determination processing unit 1014. The determination result may include information stored in each of the one or more target wireless tags that is acquired from each of the one or more target wireless tags by the reading apparatus 100. The terminal 400 may change a process aspect of the information depending on whether each of the one or more target wireless tags is included in the first range or the second range. The terminal 400 may set the information that is stored in the target wireless tag in the first range as a process target. The terminal 400 does not need to set the information that is stored in the target wireless tag in the second range as a process target.

Effect

The communication apparatus according to the embodiment includes an antenna. The communication apparatus includes a driving unit configured to move a relative position of the antenna relative to one or more wireless tags. The communication apparatus includes a measurement control unit configured to control measurement of tag data of the one or more wireless tags based on reception of radio waves from the one or more wireless tags by the antenna. The communication apparatus includes an acquisition unit configured to acquire the number of the one or more wireless tags based on the measurement of the tag data of the one or more wireless tags that is accompanied by movement of the relative position at a first moving speed controlled by the measurement control unit. The communication apparatus includes a setting unit configured to set a second moving speed of the relative position based on the number of the one or more wireless tags acquired by the acquisition unit. The measurement control unit controls measurement of the tag data of the one or more wireless tags that is accompanied by movement of the relative position at the second moving speed set by the setting unit.

This way, by acquiring the number of tags based on the measurement at the first moving speed, the communication apparatus can set the second moving speed for the measurement based on the number of tags. As a result, the communication apparatus can set the second moving speed such that tag data can be measured at a larger number of positions while reducing the measurement time. By measuring tag data at a larger number of positions for the wireless tag, the communication apparatus can improve the determination accuracy of the range where the wireless tag is present. Accordingly, the communication apparatus can set a scanning speed suitable for the measurement of the tag data of the wireless tag.

In at least one embodiment, the setting unit sets the second moving speed based on data regarding a plurality of moving speeds correlated with a plurality of steps of the number of tags stored in a storage unit.

As a result, the communication apparatus can select a moving speed corresponding to the acquired number of tags from the plurality of moving speeds correlated with the plurality of steps of the number of tags. The communication apparatus can set the second moving speed such that tag data can be measured at a larger number of positions while reducing the measurement time.

In at least one embodiment, the first moving speed is higher than or equal to the highest moving speed among the plurality of moving speeds.

In this way, the communication apparatus only needs to approximately acquire the number of tags, and thus moves the relative position of the antenna at the highest speed. As a result, the communication apparatus can approximately acquire the number of tags while reducing the measurement time.

In at least one embodiment, the plurality of moving speeds are correlated with the plurality of steps so as to be delayed as the number of tags increases.

As a result, even if there is an upper limit in the number of pieces of tag data that can be measured per unit time, the communication apparatus can measure tag data at a larger amount of positions for each of the wireless tags.

In the embodiment, the tag data includes at least one of a phase or a received signal strength indicator.

As a result, the communication apparatus can set a scanning speed suitable for measurement of at least one of a phase or a received signal strength indicator that is used for determining the range where the wireless tag is present.

OTHER EMBODIMENTS

In the above-described embodiment, the example where the measurement control unit 1011 controls the antenna 300 to move from the position L to the position 0 at the second moving speed in the second measurement process is described. However, the embodiment is not limited to this example. The measurement control unit 1011 may control the antenna 300 to move from the position 0 to the position L at the second moving speed in the second measurement process after the control of the first measurement process.

In the above-described embodiment, the example where the driving apparatus 200 moves the antenna 300 is described. However, the embodiment is not limited to this example. The position of the antenna 300 may be fixed, and the driving apparatus 200 may be an apparatus that moves the one or more target wireless tags. In this example, the driving apparatus 200 may move a stage on which the one or more target wireless tags are mounted. The movement of the one or more target wireless tags is an example of the moving relative position of the antenna 300 relative to the one or more target wireless tags. The driving apparatus 200 may be an apparatus that moves both of the antenna 300 and the one or more target wireless tags. The movement of both of the antenna 300 and the one or more target wireless tags is an example of moving the relative position of the antenna 300 relative to the one or more target wireless tags.

In the above-described embodiment, the example where the antenna 300 is an antenna that transmits and receives a radio wave is described. However, the embodiment is not limited to this example. The antenna 300 may include an antenna for transmitting a radio wave and an antenna for receiving a radio wave.

The communication apparatus may be implemented by a plurality of apparatuses as in the above-described example or may be implemented by one apparatus where the functions of the plurality of apparatuses are integrated. The reading apparatus, the driving apparatus, and the antenna may be implemented by one apparatus where the functions are integrated. The reading apparatus may be implemented by a plurality of apparatuses where the functions are distributed.

The program may be transferred in a state where the program is stored in the apparatus according to the embodiment or may be transferred in a state where the program is not stored in the apparatus. In the latter case, the program may be transferred via a network or may be transferred in a state where the program is recorded in a recording medium. The recording medium is a non-transitory tangible medium. The recording medium is a computer-readable medium. The form of the recording medium is not limited as long as it is a medium such as a CD-ROM or a memory card that can store the program and can be read by a computer.

While certain embodiments have been described these embodiments have been presented by way of example only, and are not intended to limit the scope of the embodiments. Indeed, the novel embodiments described herein may be embodied in a variety of other forms: furthermore various omissions, substitutions and changes in the form of the embodiments described herein may be made without departing from the spirit of the embodiments. The accompanying claims and their equivalents are intended to cover such embodiments or modifications as would fall within the scope and spirit of the embodiments.

What is claimed is:

1. A communication apparatus comprising:
   an antenna;
   a driver configured to move a relative position of the antenna within a moving range relative to one or more wireless tags;
   a processor configured to:
   measure tag data of the one or more wireless tags based on the antenna receiving radio waves from the one or more wireless tags in response to radio wave transmission of a movement of the relative position of the antenna within the moving range at a first moving speed,
   acquire a number of the one or more wireless tags based on the measured tag data of the one or more wireless tags that is accompanied by the movement of the relative position of the antenna within the moving range at the first moving speed,
   set a second moving speed of a movement of the relative position of the antenna in the moving range based on the acquired number of the one or more wireless tags, and
   measure tag data of the one or more wireless tags that is accompanied by the movement of the relative position of the antenna in the moving range at the second moving speed.

2. The apparatus according to claim 1, wherein the processor is configured to set the second moving speed based on data regarding a plurality of moving speeds correlated with a plurality of steps of the number of the one or more wireless tags stored in a storage.

3. The apparatus according to claim 2, wherein the plurality of moving speeds are correlated with the plurality of steps so as to be reduced as the number of the one or more wireless tags increases.

4. The apparatus according to claim 2, wherein the first moving speed is higher than or equal to the highest moving speed among the plurality of moving speeds.

5. The apparatus according to claim 1, wherein the tag data includes at least one of a phase or a received signal strength indicator.

6. The apparatus according to claim 1, wherein the driver is configured to move the antenna in a reciprocating manner.

7. The apparatus according to claim 1, wherein the driver is configured to move the antenna in the moving range from a home position to a second position.

8. The apparatus according to claim 1, wherein the first moving speed corresponds to a scanning speed.

9. The apparatus according to claim 1, wherein the second moving speed is a moving speed of the relative position of the antenna.

10. A method for operating a communication apparatus comprising an antenna and a driver configured to move a relative position of the antenna within a moving range relative to one or more wireless tags, the method comprising:
    measuring, by a processor of the communication apparatus, tag data of the one or more wireless tags based on the antenna receiving radio waves from the one or more wireless tags in response to radio wave transmission of a movement of the relative position of the antenna within the moving range at a first moving speed;
    acquiring, by the processor, a number of the one or more wireless tags based on the measuring of the tag data of the one or more wireless tags that is accompanied by the movement of the relative position of the antenna within the moving range at the first moving speed;
    setting a second moving speed of a movement of the relative position of the antenna in the moving range based on the number of the one or more wireless tags; and
    measuring tag data of the one or more wireless tags that is accompanied by said movement of the relative position of the antenna in the moving range at the second moving speed.

11. The method according to claim 10, wherein the second moving speed is set based on data regarding a plurality of moving speeds correlated with a plurality of steps of the number of the one or more wireless tags stored in a storage.

12. The method according to claim 11, wherein the plurality of moving speeds are correlated with the plurality of steps so as to be reduced as the number of the one or more wireless tags increases.

13. The method according to claim 11, wherein the first moving speed is higher than or equal to the highest moving speed among the plurality of moving speeds.

14. The method according to claim 10, wherein the tag data includes at least one of a phase or a received signal strength indicator.

* * * * *